(12) United States Patent
Sato

(10) Patent No.: US 6,999,096 B2
(45) Date of Patent: Feb. 14, 2006

(54) METHOD AND APPARATUS FOR RENDERING USING SYMPLECTIC RAY TRACING

(75) Inventor: Tetsu Sato, Tokyo (JP)

(73) Assignee: National Institute of Information and Communications Technology, Tokyo (JP)

( * ) Notice: Subject to any disclaimer, the term of this patent is extended or adjusted under 35 U.S.C. 154(b) by 131 days.

(21) Appl. No.: 10/652,488

(22) Filed: Sep. 2, 2003

(65) Prior Publication Data

US 2005/0046641 A1    Mar. 3, 2005

(51) Int. Cl.
G09G 5/02    (2006.01)
G09G 5/00    (2006.01)

(52) U.S. Cl. ..................... 345/589; 345/653
(58) Field of Classification Search ............... 345/424, 345/427, 653, 589; 382/154
See application file for complete search history.

(56) References Cited

U.S. PATENT DOCUMENTS

| | | | | |
|---|---|---|---|---|
| 5,305,430 A | * | 4/1994 | Glassner | ..................... 345/427 |
| 5,442,733 A | * | 8/1995 | Kaufman et al. | ........... 345/424 |
| 5,442,773 A | * | 8/1995 | Oto | ............................. 713/400 |
| 5,588,098 A | * | 12/1996 | Chen et al. | .................. 345/653 |
| 6,160,907 A | * | 12/2000 | Robotham et al. | .......... 382/154 |

* cited by examiner

Primary Examiner—Matthew C. Bella
Assistant Examiner—Anthony J. Blackman

(57) ABSTRACT

The method for rendering using symplectic ray tracing is comprised the step of fixing the location of observation, fixing view screen of observation, practicing the symplectic ray tracing, acquiring the information of the color where the light rays cross the surface of the objects, rendering the objects according to the information of the color acquired.

The symplectic ray tracing of the present invention forms the Hamilton's canonical equation by applying the fast automatic differentiation techniques with the Hamiltonian H of the objects, and practices the symplectic integration by applying the symplectic Euler method to the formed Hamilton's canonical equation. The present invention can provide the apparatus and method for rendering which can visualize the phenomena in non-homogeneously transparent object or the four-dimensional black hole space time.

3 Claims, 7 Drawing Sheets

Hamiltonian time step

Hamiltonian time step

METHOD AND APPARATUS FOR RENDERING USING SYMPLECTIC RAY TRACING

BACKGROUND OF THE INVENTION

1. Technical Field to which the Invention Pertains

The present invention relates to the rendering techniques which traces the paths of curved light rays and renders the object. More particularly, the present invention relates to the apparatus and method for rendering using symplectic ray tracing which solves the Hamilton's canonical equation by applying symplectic numerical method and traces the paths of light rays.

2. Description of the Related Art

It is a basic technique to visualize objects for analyzing dynamical systems. There are many methods of visualizing dynamical systems by using computer graphics. Among the many methods of visualization, ray tracing is probably one of the most famous methods using computer graphics.

Conventional ray tracing employs straight lines to calculate the paths of light rays. The equation of a straight line is given here.

$$r = a + sv \quad \text{(Equation 1)}$$

where r is a location component on the paths of light rays, a is a starting point, v is a direction vector and s is a parameter.

(Equation 1) can be rewritten as follows for the components of the vectors:

$$x_i = a_i + s v_i \quad \text{(Equation 2)}$$

where $x_i$ is a component of vector r. By differentiating twice, (Equation 2) can be rewritten as a form of differential equation:

$$\frac{d^2 x^i}{ds^2} = 0 \quad \text{(Equation 3)}$$

Traditional ray tracing is thus a rendering technique in which the path of a light ray is calculated by solving (Equation 3).

But, there are many non-linear optical phenomena such as a quantity of air above the ground which is a phenomena in non-homogeneously transparent object. People would sometimes like to visualizing the four-dimensional black hole space time.

For example, in non-homogeneously transparent object, the equation for light rays is given by $$\frac{dn}{ds}\frac{dx^i}{ds} + n\frac{d^2 x^i}{ds^2} = \frac{\partial n}{\partial x^i} \quad \text{(Equation 4)}$$

where n is the refractive index. (Equation 4) is derived from the Fermat's principle in geometric optics. When n is constant, (Equation 4) reduces to (Equation 3).

In black-hole space time, the equation for a light ray is given by $$\frac{d^2 x^i}{ds^2} + \Gamma^i_{kl}\frac{dx^k}{ds}\frac{dx^l}{ds} = 0 \quad \text{(Equation 5)}$$

where $\Gamma_{kl}^i$, called the Christoffel symbol, is a function used to calculate the curvature of space. (Equation 5) is known as the geodesic equation.

Traditional ray tracing can not visualize the phenomena in non-homogeneously transparent object or the four-dimensional black hole space time.

SUMMARY OF THE INVENTION

An object of the present invention is to visualize the phenomena in non-homogeneously transparent object or the four-dimensional black hole space time.

The present invention forms the Hamilton's canonical equation by applying the fast automatic differentiation techniques, and applies the symplectic Euler method to the formed Hamilton's canonical equation, and solves the equation by practicing the symplectic integration.

The present invention fixes the location of observation and fixes view screen of observation, practices the symplectic ray tracing by applying the fast automatic differentiation techniques and symplectic integration described above, and acquire the information of the color where the light rays cross the surface of the objects, render the objects according to the information of the color acquired.

DETAILED DESCRIPTION OF THE PREFERRED EMBODIMENT

First, the principle of the present invention is described. As described above, past studies have adopted equations such as the geodesic equation, the Helmholtz equation, the Eikonal equation, and so on. However, from a mathematical point of view, all of those equations can be represented in terms of the Hamilton's canonical equation:

$$\frac{dp_i}{ds} = -\frac{\partial H}{\partial q_i}, \quad \frac{dq_i}{ds} = -\frac{\partial H}{\partial p_i} \quad \text{(Equation 6)}$$

where $q_i$ indicates the location component, $p_i$ indicates the momentum of $q_i$ and H is a Hamiltonian composed of $q_i$ and $p_i$.

For example, the Hamiltonian that lead to the (Equation 3) is given by $$H=(p_x^2+p_y^2+p_z^2)/2$$

When the Hamiltonian is partially differentiated, and form the Hamilton's canonical equation, the equation of the straight line is obtained. In non-homogeneously transparent object such as a quantity of air above the ground, the Hamiltonian is given as $$H=n(x,y,z)(p_x^2+p_y^2+p_z^2)/2$$

In consideration of the theory of relativity, the Hamiltonian for calculating the paths of light rays in spherically symmetrical black-hole space-time is given as $$H = \left(1 - \frac{r_g}{r}\right)^{-1} \frac{p_t^2}{2} - \left(1 - \frac{r_g}{r}\right)\frac{p_r^2}{2} - \frac{p_\theta^2}{2r^2} - \frac{p_\phi^2}{2r^2\sin^2\theta}$$

where (t, r, θ, φ) are the components of a set of four-dimensional polar coordinates, ($p_t$, $p_r$, $p_\theta$, $p_\phi$) denotes the corresponding momentum components, and $r_g$ is the mass corresponds to the mass of the black hole called the black-hole radius.

In general, provided the Einstein equation is $g^{ij}$, a Hamiltonian for the light rays is given as $$H = \frac{1}{2}\sum_{i,j=0}^{3} g^{ij} p_i p_j$$

As described above, the Hamiltonian of the motion of the light rays can usually be obtained. Therefore, various objects can be simulated simply by applying the Hamilton's canonical equation without implementing different equations.

Here the symplectic numerical method of the present invention will be described. The characteristic of the Hamilton's canonical equation is that the equation preserves the property of the symplecticness. The symplecticness is the property of the symplectic map defined as follows.

(Definition) Let $(p(t_0),q(t_0))$ be a point at $(t=t_0)$ and $(p(t_0+\Delta t),q(t_0+\Delta t))$ be a point at $(t=t_0+\Delta t)$. For all real numbers $t_0$, the mapping $(p(t_0),q(t_0))\rightarrow(p(t_0+\Delta t),q(t_0+\Delta t))$ is a symplectic map if and only if $dq(t_0)\wedge dp(t_0)=dq(t_0+\Delta t)\wedge dp(t_0+\Delta t)$, where dq and dq are one-forms of variables and $\wedge$ is the exterior product operator.

Figure 1:
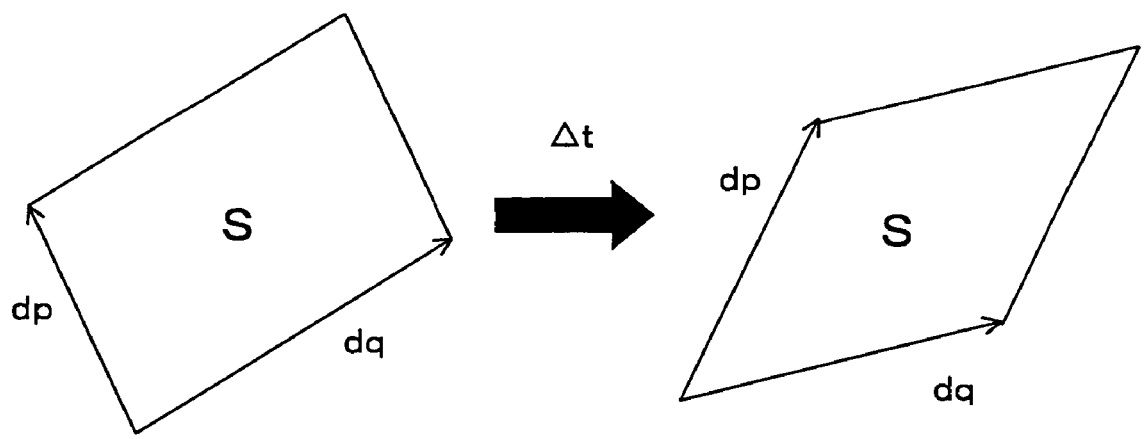
FIG. 1 is a diagram which shows the meaning of the symplectic map.

FIG. 1 is a diagram which shows the meaning of the symplectic map. The symplecticness means that the area (S) of the parallelogram constructed of the vector dp and dp is preserved.

The present invention applies the Hamilton's canonical equation to any objects and solves the equation by applying the symplectic numerical method which preserves the property of the symplecticness and traces the path of light ray. This method is called the symplectic ray tracing. In the symplectic numerical method, the result of the calculation adopting original value satisfies the definition above.

The present invention is able to reduce the error occurred in tracing the path of the light ray by applying the symplectic integration. Therefore the phenomena in non-homogeneously transparent object or the four-dimensional black hole space time can be visualized.

The present invention uses the symplectic Euler method which is the implicit Euler method as the symplectic numerical method. The symplectic Euler method applies the scheme shown below to the Hamilton's canonical equation.

$$p_{k+1} = p_k - \tau \frac{\partial H(p_{k+1}, q_{k+1})}{\partial q_{k+1}}$$

$$q_{k+1} = q_k + \tau \frac{\partial H(p_{k+1}, q_{k+1})}{\partial p_{k+1}}$$

The performance of the calculation of the symplectic Euler method differ much from the performance of the explicit Euler method which uses the scheme shown bellow.

$$p_{k+1} = p_k - \tau \frac{\partial H(p_k, q_k)}{\partial q_k}$$

$$q_{k+1} = q_k + \tau \frac{\partial H(p_k, q_k)}{\partial p_k}$$

Figure 2A:
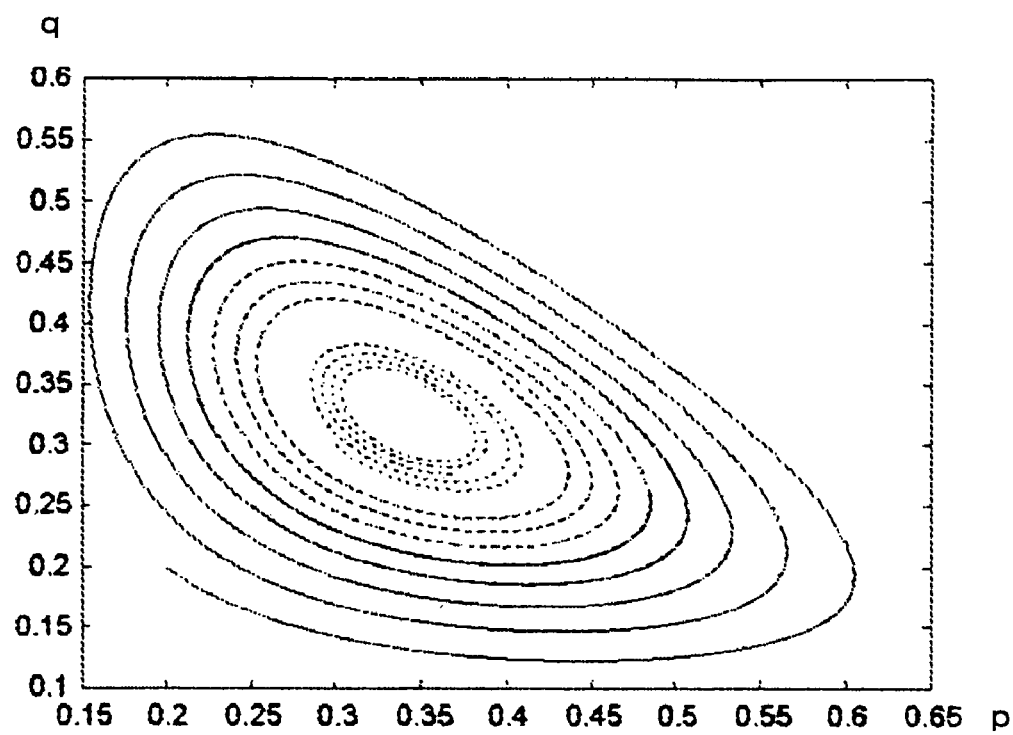
FIG. 2A is a diagram which shows the result of the calculation obtained by the explicit Euler method.
Figure 2B:
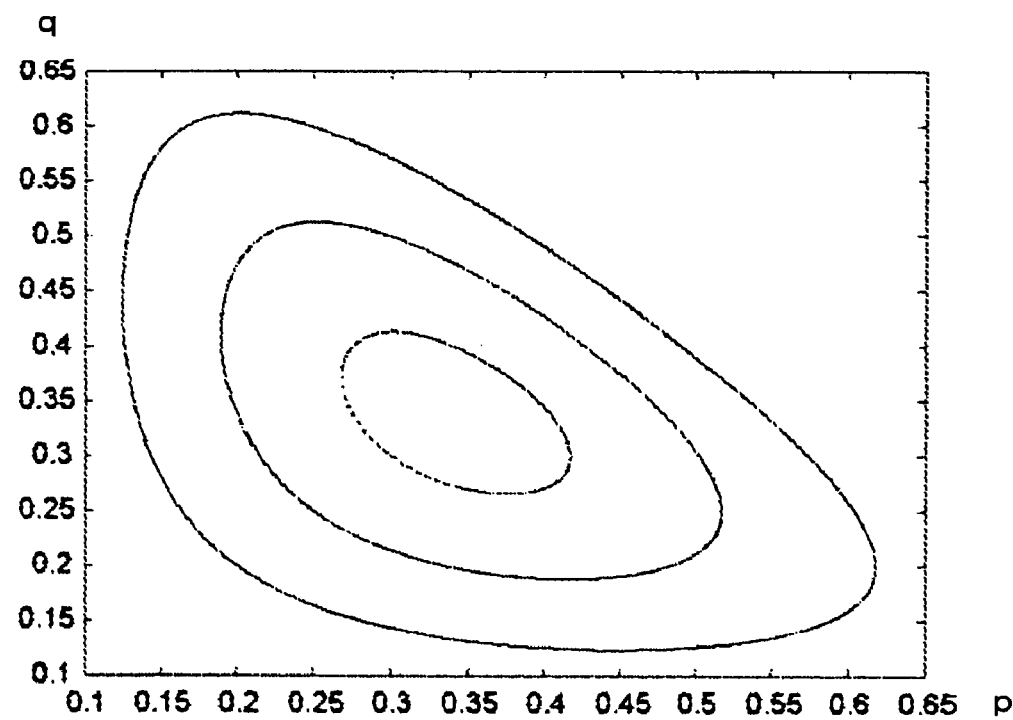
FIG. 2B is a diagram which shows the result of the calculation obtained by the symplectic Euler method.

FIG. 2A and FIG. 2B shows a very simple example comparing symplectic Euler method and explicit Euler method. Each curve in the (p–q) plane indicates the orbit of a light ray where H=pq(p+q−1).

FIG. 2A shows the result obtained by using the explicit Euler method while FIG. 2B shows that obtained by using the symplectic Euler method. Since analytical solutions of the equation for this system give closed curves, FIG. 2B should give a correct result.

Figure 3A:
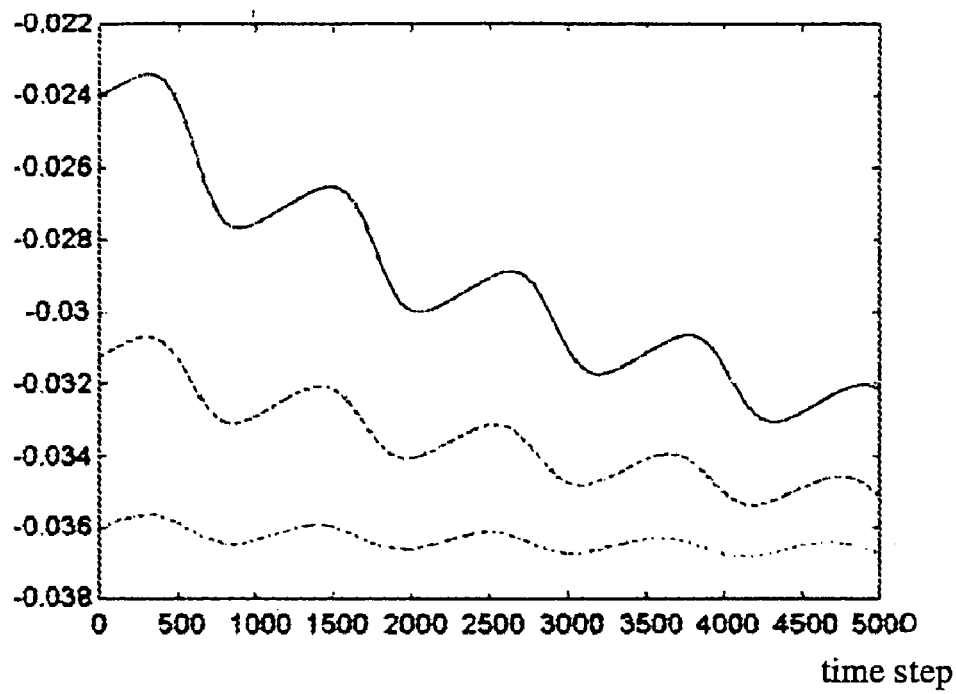
FIG. 3A shows the values of the Hamiltonian obtained by the explicit Euler method.
Figure 3B:
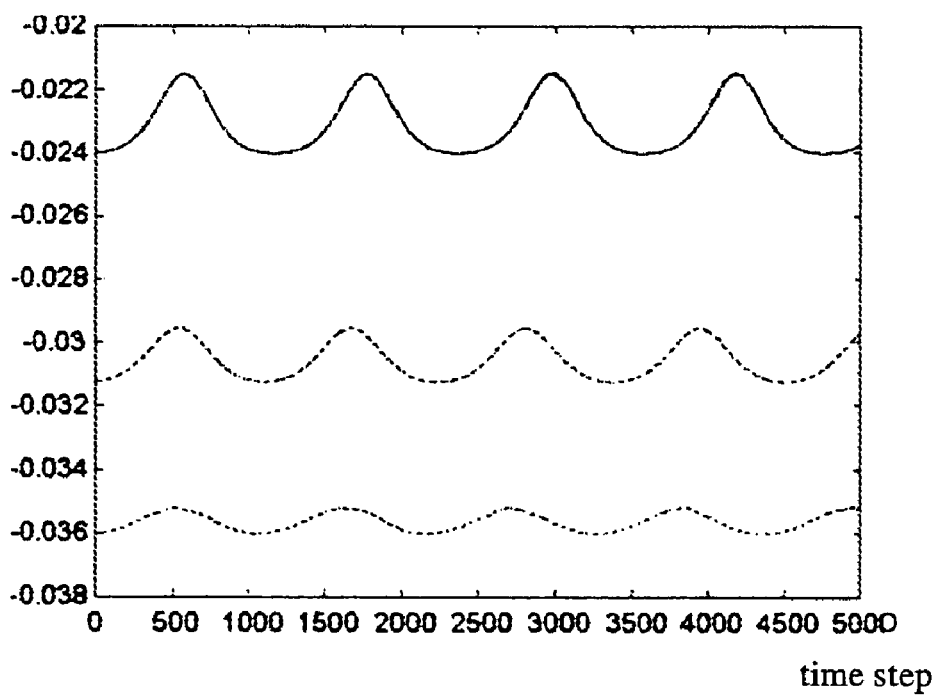
FIG. 3B shows the values of the Hamiltonian obtained by the symplectic Euler method.

FIG. 3A and FIG. 3B shows the values of the Hamiltonian that have to be preserved. FIG. 3A shows the values of the Hamiltonian obtained by the explicit Euler method. The Hamiltonian decreases as the calculation proceeds.

FIG. 3B shows the values of the Hamiltonian obtained by the symplectic Euler method. The values of the Hamiltonian are preserved as long as the vibrations are negligible.

In this test case, the form of the Hamiltonian is so simple that it appears there are no problem with the symplectic numerical method. However, it is hard to apply the Hamilton's canonical equation to a complex Hamiltonian, because forming the Hamilton's canonical equation by applying the symplectic Euler method requires all the derivatives of the Hamiltonian.

For example, the Hamiltonian in axisymmetric space-time is given as $$H = \left(1 + \frac{r_g r(a^2 + r^2)}{\rho^2 \Delta}\right)\frac{p_t^2}{2} - \frac{\Delta}{\rho^2}\frac{p_r^2}{2} - \frac{1}{\rho^2}\frac{p_\theta^2}{2} - \frac{\rho^2 - r_g r}{\rho^2 \Delta \sin^2\theta}\frac{p_\phi^2}{2} + \frac{ar_g r}{\rho^2 \Delta}p_t p_\phi,$$ (Equation 7)

where a corresponds to the angular momentum of the black hole, and $$\rho^2 = r^2 + a^2 \cos^2\theta, \Delta = r^2 - r_g r + a^2$$

For the above Hamiltonian, Mathematica, a software for culclation, outputs the derivative of θ as follows.

$$D[H, \theta] = \frac{2p_\phi p_t r r_g \cos\theta \sin\theta a^3}{(a^2 + r^2 - rr_g)(r^2 + a^2\cos^2\theta)^2} -$$

-continued $$\frac{p_\phi^2(r^2 - r_g r + a^2\cos^2\theta)\cot\theta a^2}{(a^2 + r^2 - rr_g)(r^2 + a^2\cos^2\theta)^2} + \frac{p_\phi^2\cot\theta a^2}{(a^2 + r^2 - rr_g)(r^2 + a^2\cos^2\theta)} -$$

$$\frac{p_\theta^2\cos\theta\sin\theta a^2}{(r^2 + a^2\cos^2\theta)^2} - \frac{p_r^2(a^2 + r^2 - rr_g)\cos\theta\sin\theta a^2}{(r^2 + a^2\cos^2(\theta))^2} +$$

$$\frac{p_t^2 r(a^2 + r^2)r_g\cos\theta\sin\theta a^2}{(a^2 + r^2 - rr_g)(r^2 + a^2\cos^2\theta)^2} + \frac{p_\phi^2(r^2 - r_g r + a^2\cos^2\theta)\cot\theta\csc^2\theta}{(a^2 + r^2 - rr_g)(r^2 + a^2\cos^2\theta)}$$

Implementation of such a complicated expression would lead to mistakes and a slow computation speed.

The present invention adopts the fast automatic differentiation techniques and calculates the differentiation of a given Hamiltonian H automatically and forms the Hamilton's canonical equation.

(Fast Automatic Differentiation Techniques)

In this fast automatic differentiation techniques, a vector is defined $(f(p, q), \partial pf, \partial qf)$ For example, addition and multiplication are defined as follows:

$$(f, \partial_p f, \partial_q f) + (g, \partial_p g, \partial_q g) = (f + g, \partial_p f + \partial_q g, \partial_p f + \partial_q g)$$

$$(f, \partial_p f, \partial_q f) \times (g, \partial_p g, \partial_q g) = (fg, \partial_p f \times g + f \times \partial_p g,$$

$$\partial_q f \times g + f \times \partial_q g)$$

As shown above, by defining the overload of the operator, the operations and partial differentiations are calculated simultaneously. For example, by using the rule of the calculation shown above, the result of multiplication as follows can be obtained, $(x^2, 2x) \times (x, 1) = (x^3, 3x^2)$, while $x^2$ times x is $x^3$ and the differential is $3x^2$. That is to say, when the multiplication is calculated, the differential can be obtained automatically.

When the value of the Hamiltonian is calculated by applying the symplectic ray tracing, all the derivatives of the Hamiltonian can be obtained simultaneously. Therefore, the Hamilton's canonical equation can be formed.

For a given Hamiltonian H=pq, fast automatic differentiation calculates $$(p, 1, 0) \times (q, 0, 1) = (p \times q, \partial_p p \times q + p \times \partial_p q, \partial_q p \times q + p \times \partial_q q)$$

$$= (pq, 1 \times q + p \times 0, 0 \times q + p \times 1)$$

$$= (pq, q, p)$$

$$= (H, \partial_p H, \partial_q H)$$

As shown above, the operations and partial differentiations are calculated simultaneously without truncation errors. That leads to the formation of the Hamilton's canonical equation.

Figure 4:
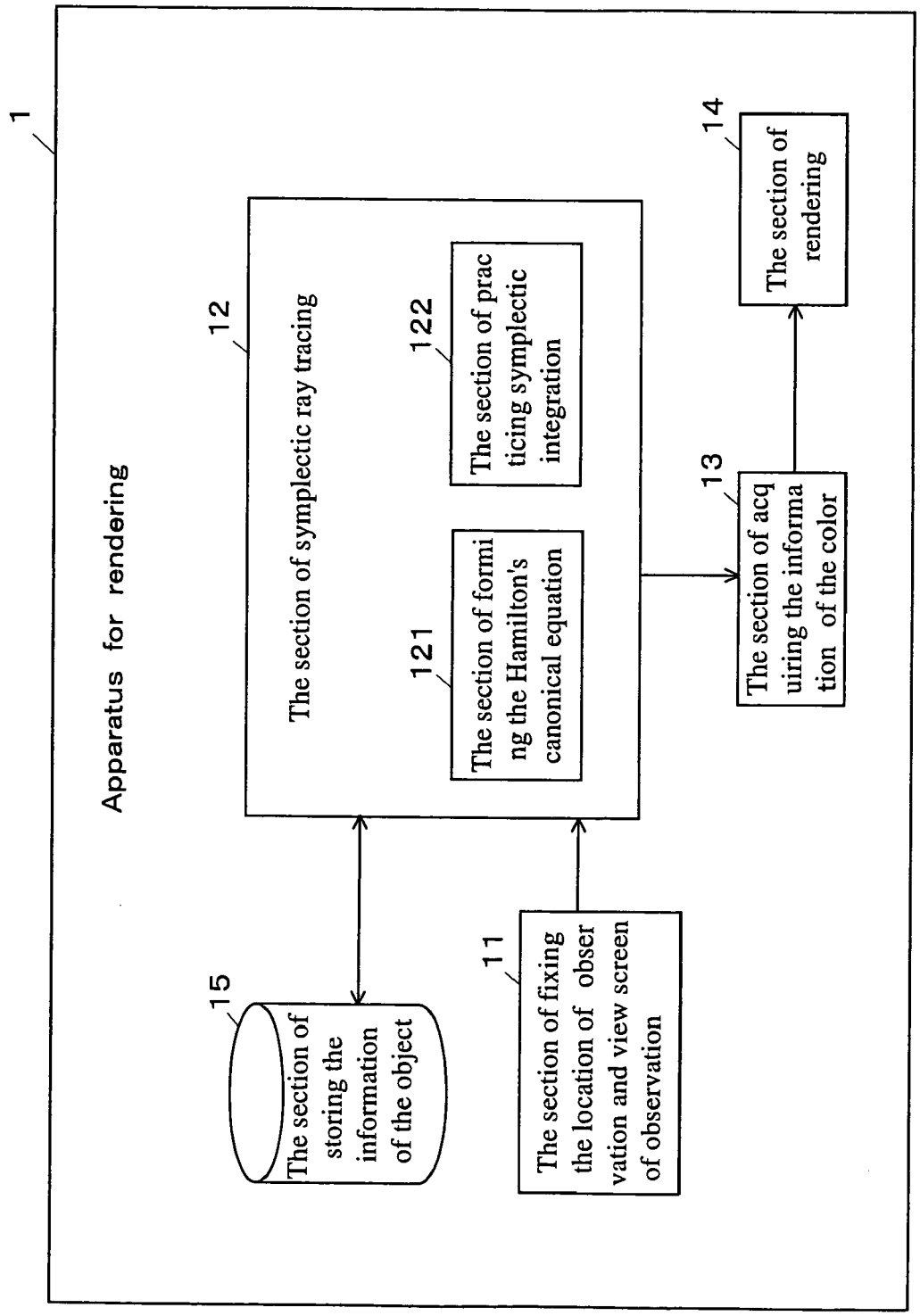
FIG. 4 shows the construction of the apparatus for rendering of the present invention.

FIG. 4 shows the apparatus for rendering which the present invention provides. 1 is the apparatus for rendering. 11 is the section of fixing the location of observation and view screen of observation. 12 is the section of symplectic ray tracing which practices symplectic ray tracing. 13 is the section of acquiring the information of the color which acquires the information of the color of the cross section of the light ray and the surface of the objects. 14 is the section of rendering which renders the objects based on the information of the color acquired. 15 is the section of storing the information of the object which stores the information of the object and of the Hamiltonian H which corresponds to the object.

In the section of symplectic ray tracing 12,121 is the section of forming the Hamilton's canonical equation which forms the Hamilton's canonical equation, 122 is the section of practicing symplectic integration which practices symplectic integration by applying the symplectic Euler method to the Hamilton's canonical equation.

Figure 5:
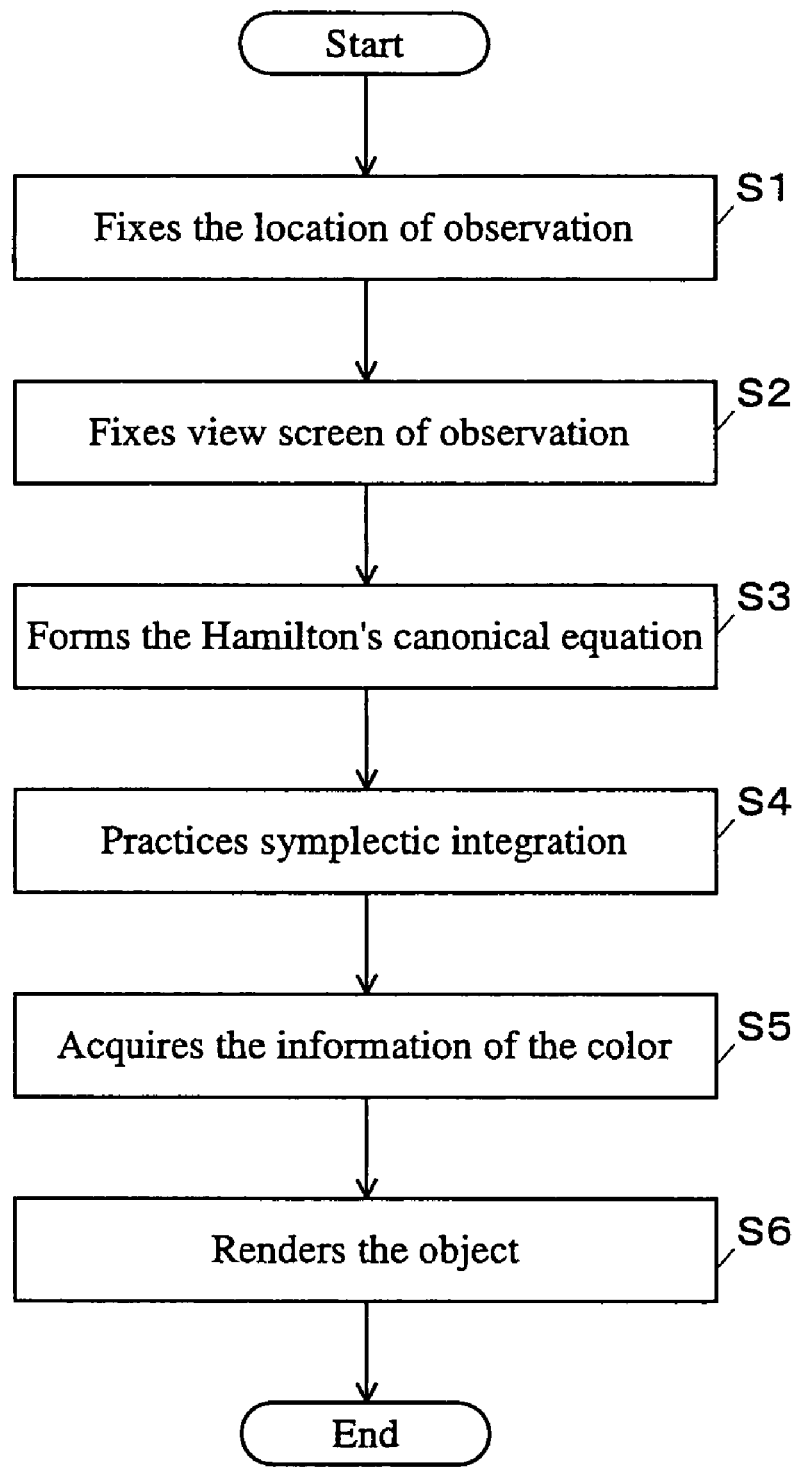
FIG. 5 is the flowchart of the rendering process of the present invention.
Figure 6:
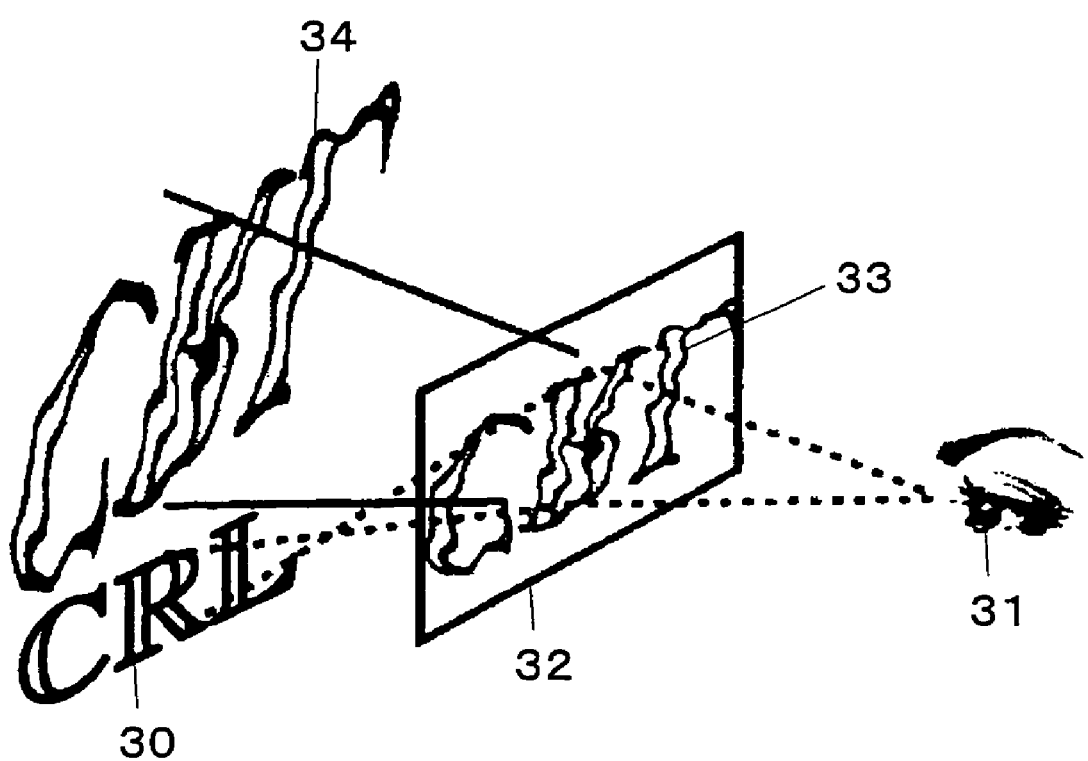
FIG. 6 shows the outline of the method for rendering of the present invention.

Following, the rendering process of the present invention will be described by using the FIG. 5 and FIG. 6. FIG. 5 is the flowchart of the rendering process of the present invention. In FIG. 6 which shows the outline of the method for rendering of the present invention, the string CRL 30 in the lower left part represents the object.

First, the section of fixing the location of observation and fixing view screen of observation fixes the location of observation (step S1). For example the section fixes the location of the eye of the observer 31 shown in FIG. 6. Next, the section of fixing the location of observation and fixing view screen of observation fixes view screen of observation 32 (step S2). In FIG. 6, view screen of observation 32 is shown in the middle. Next, the section of practicing the symplectic ray tracing 12 practices the step 3 and step 4 shown below to trace the path of light ray until the light ray cross to the object (simplectic ray tracing).

The section of forming the Hamilton's canonical equation 121 forms the Hamilton's canonical equation (step S3). That is to say, based on the Hamiltonian H of the object which is deribed from the section of storing the information of the object 15, the section of forming the Hamilton's canonical equation 121 forms the Hamilton's canonical equation applying the fast automatic differentiation techniques. For example, as described above, when H=pq is calculated by applying the Fast automatic differentiation techniques, all the derivatives of the Hamiltonian shown below can be obtained and the Hamilton's canonical equation can be formed.

$$(p, 1, 0) \times (q, 0, 1) = (p \times q, \partial_p p \times q + p \times \partial_p q, \partial_q p \times q + p \times \partial_q q)$$

$$= (pq, 1 \times q + p \times 0, 0 \times q + p \times 1)$$

$$= (pq, q, p)$$

$$= (H, \partial_p H, \partial_q H)$$

And the section of practicing symplectic integration 122 practices symplectic integration (step S4). That is to say, the section of practicing symplectic integration 122 practices symplectic integration by applying the symplectic Euler method to the formed Hamilton's canonical equation.

By practicing the symplectic integration by applying the symplectic Euler method, the value of p and q can be obtained one after another and the paths of the light ray can be traced.

Next, the section of acquiring the information of the color 13 acquires the information of the color (step S5). In particular, the section of acquiring the information of the color 13 acquires the information of the color of the cross section of the light rays and the surface of the object. And the section of rendering the objects 14 renders the object (step S6). And the process described above finishes. For example, when the light rays travel along the dotted curves, the string CRL is rendered upside down. 33 is the illustration rendered on view screen of the object 32, and 34 is the illustration perceived by the observer's eye.

Figure 7:
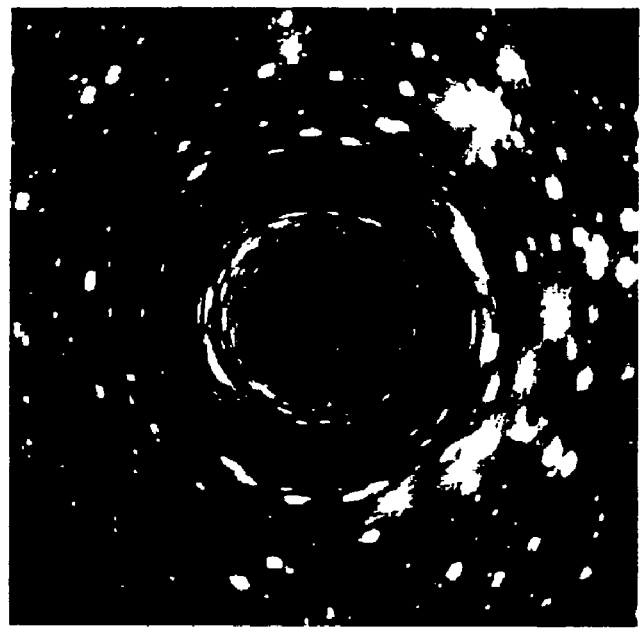
FIG. 7 shows the example of the rendering obtained by the present invention.

The example of the rendering of the present invention is shown below. In the present invention, black-hole space-time is refered as a four-dimensional space with a black hole at the origin. For example, the Hamiltonian as follows generates the result shown in FIG. 7.

$$H = \left(1 - \frac{r_g}{r}\right)^{-1} \frac{p_t^2}{2} - \left(1 - \frac{r_g}{r}\right) \frac{p_r^2}{2} - \frac{p_\theta^2}{2r^2} - \frac{p_\phi^2}{2r^2 \sin^2 \theta}$$

This phenomenon is known as the gravitational convex lens effect.

Figure 8:
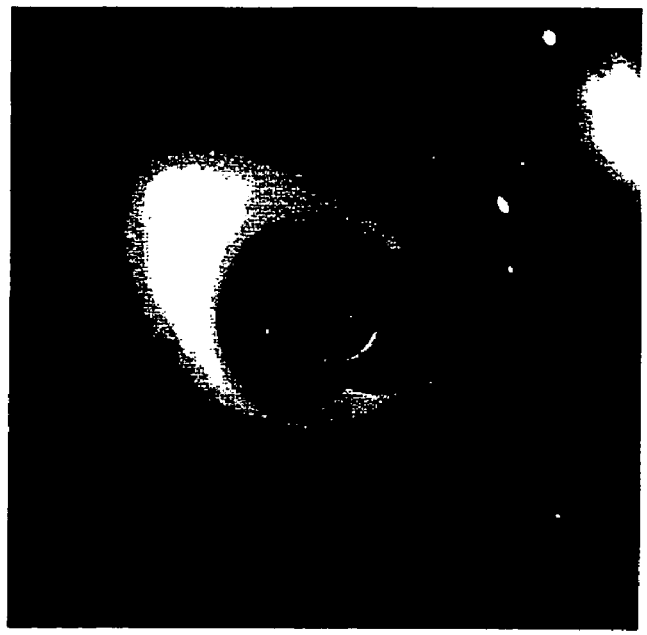
FIG. 8 shows the example of the rendering obtained by the present invention.

The Hamiltonian of (Equation7) which is in an axisymmetric space-time generates the result shown in FIG. 8.

What is claimed is:

1. A method for rendering using symplectic ray tracing, the method comprising:
    fixing a location of observation;
    fixing a view screen of observation;
    practicing symplectic ray tracing;
    acquiring color information where light rays cross a surface of an object; and
    rendering the object according to the information acquired,
    wherein practicing symplectic ray tracing includes
        deriving a pre-stored Hamiltonian corresponding to the object;
        acquiring all derivatives of the Hamiltonian by applying fast automatic differentiation techniques;
        forming a Hamilton's canonical equation; and
        practicing symplectic integration by applying a symplectic Euler method to the formed Hamilton's canonical equation.

2. An apparatus for rendering using symplectic ray tracing, the apparatus comprising:
    a fixing section fixing a location of observation, and fixing a view screen of observation;
    a practicing section practicing the symplectic ray tracing,
    an information acquiring section acquiring color information where light rays cross a surface of an object; and
    a rendering section rendering the object according to the color information acquired,
    wherein the practicing section derives a pre-stored Hamiltonian corresponding to the object, acquires all derivatives of the Hamiltonian by applying fast automatic differentiation techniques, forms a Hamilton's canonical equation, and then practices symplectic integration by applying a symplectic Euler method to the formed Hamilton's canonical equation.

3. An apparatus for rendering using symplectic ray tracing as in claim 2, wherein the practicing section includes:
    a forming section forming the Hamilton's canonical equation by applying fast automatic differentiation techniques, and
    a symplectic integration section practicing symplectic integration by applying the symplectic Euler method to the formed Hamilton's canonical equation.

* * * * *

UNITED STATES PATENT AND TRADEMARK OFFICE
CERTIFICATE OF CORRECTION

PATENT NO. : 6,999,096 B2
APPLICATION NO. : 10/652488
DATED : February 14, 2006
INVENTOR(S) : Tetsu Sato It is certified that error appears in the above-identified patent and that said Letters Patent is hereby corrected as shown below:

On the title page, item [57]: (Abstract), Lines 6-7, delete the space between lines 6 and 7.
Column 7, Line 27 (claim 1, line 8), insert - - color - - before "information".

Signed and Sealed this

Eighth Day of August, 2006

JON W. DUDAS
*Director of the United States Patent and Trademark Office*